(12) United States Patent
Fanton et al.

(10) Patent No.: US 9,665,708 B2
(45) Date of Patent: *May 30, 2017

(54) SECURE SYSTEM FOR ALLOWING THE EXECUTION OF AUTHORIZED COMPUTER PROGRAM CODE

(71) Applicant: Fortinet, Inc., Sunnyvale, CA (US)

(72) Inventors: Andrew F. Fanton, Westminster, CO (US); John J. Gandee, Loveland, CO (US); William H. Lutton, Fort Collins, CO (US); Edwin L. Harper, Platteville, CO (US); Kurt E. Godwin, Loveland, CO (US); Anthony A. Rozga, Wellington, CO (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,205

(22) Filed: May 13, 2016

(65) Prior Publication Data

US 2016/0253491 A1 Sep. 1, 2016

Related U.S. Application Data

(63) Continuation of application No. 14/981,262, filed on Dec. 28, 2015, which is a continuation of application (Continued)

(51) Int. Cl.
*G06F 21/44* (2013.01)
*G06F 21/10* (2013.01)
(Continued)

(52) U.S. Cl.
CPC ............. *G06F 21/44* (2013.01); *G06F 21/10* (2013.01); *G06F 21/51* (2013.01); *G06F 21/52* (2013.01);
(Continued)

(58) Field of Classification Search
CPC ........ G06F 21/10; G06F 21/52; G06F 21/602; G06F 21/44; G06F 21/53; G06F 21/51;
(Continued)

(56) References Cited

U.S. PATENT DOCUMENTS 5,257,381 A 10/1993 Cook
5,283,856 A 2/1994 Gross et al.
(Continued)

FOREIGN PATENT DOCUMENTS

DE 10208442 5/2003
WO 0177811 10/2001

OTHER PUBLICATIONS

Notice of Allowance for U.S. Appl. No. 13/305,740 mailed Apr. 27, 2012.
(Continued)

*Primary Examiner* — Thanhnga B Truong
(74) *Attorney, Agent, or Firm* — Hamilton, DeSanctis & Cha LLP

(57) ABSTRACT

Systems and methods for selective authorization of code modules are provided. According to one embodiment, a kernel-level driver within a kernel of an operating system of a computer system intercepts activity in connection with a file system associated with the computer system or the operating system relating to a code module. A determination is made by the kernel-level driver regarding whether to allow the intercepted activity to proceed by performing a real-time authentication process of the code module with reference to a multi-level whitelist database architecture, including a local copy of a remote global whitelist database hosted by a trusted their-party service provider, a local whitelist database and a most recently used (MRU) cache. When the intercepted activity is allowed to proceed as a result of the determination, the code module is permitted by (Continued)

the kernel-level driver to be loaded and executed by the computer system.

20 Claims, 6 Drawing Sheets

Related U.S. Application Data

No. 14/546,150, filed on Nov. 18, 2014, now Pat. No. 9,305,159, which is a continuation of application No. 14/487,348, filed on Sep. 16, 2014, now Pat. No. 9,075,984, which is a continuation of application No. 14/155,218, filed on Jan. 14, 2014, now Pat. No. 8,850,193, which is a continuation of application No. 14/083,087, filed on Nov. 18, 2013, now Pat. No. 8,813,230, which is a continuation of application No. 13/912,454, filed on Jun. 7, 2013, now Pat. No. 8,589,681, which is a continuation of application No. 13/438,799, filed on Apr. 3, 2012, now Pat. No. 8,464,050, which is a continuation of application No. 13/045,781, filed on Mar. 11, 2011, now Pat. No. 8,151,109, which is a continuation of application No. 12/905,193, filed on Oct. 15, 2010, now Pat. No. 8,069,487, which is a continuation of application No. 11/296,094, filed on Dec. 5, 2005, now Pat. No. 7,698,744.

(60) Provisional application No. 60/633,272, filed on Dec. 3, 2004.

(51) Int. Cl.

| | | |
|---|---|---|
| *G06F 21/51* | (2013.01) | |
| *G06F 21/52* | (2013.01) | |
| *G06F 21/60* | (2013.01) | |
| *H04L 29/06* | (2006.01) | |
| *G06F 21/53* | (2013.01) | |
| *H04L 9/32* | (2006.01) | |
| *H04L 9/06* | (2006.01) | |

(52) U.S. Cl.
CPC ............ *G06F 21/53* (2013.01); *G06F 21/602* (2013.01); *H04L 9/0643* (2013.01); *H04L 9/32* (2013.01); *H04L 9/3239* (2013.01); *H04L 63/08* (2013.01); *H04L 63/0884* (2013.01); *H04L 63/10* (2013.01); *H04L 63/145* (2013.01); *G06F 2221/033* (2013.01); *G06F 2221/2141* (2013.01); *Y10S 707/99934* (2013.01); *Y10S 707/99943* (2013.01); *Y10S 707/99944* (2013.01)

(58) Field of Classification Search
CPC .... G06F 12/14; G06F 12/1491; G06F 9/4406; G06F 21/575; G06F 21/34; G06F 17/30067; H04L 63/145; H04L 63/0884; H04L 63/08; H04L 9/3239; H04L 63/10; H04L 9/03
USPC ........ 713/150, 161, 164, 165; 726/9, 16, 18, 726/22–27; 709/224, 225
See application file for complete search history.

(56) References Cited

U.S. PATENT DOCUMENTS

| | | |
|---|---|---|
| 5,293,629 A | 3/1994 | Conley et al. |
| 5,311,591 A | 5/1994 | Fischer |
| 5,363,487 A * | 11/1994 | Willman ............ G06F 17/30067 707/E17.01 |
| 5,398,196 A | 3/1995 | Chambers |
| 5,440,723 A | 8/1995 | Arnold et al. |
| 5,452,442 A | 9/1995 | Kephart |
| 5,475,839 A | 12/1995 | Watson et al. |
| 5,485,575 A | 1/1996 | Chess et al. |
| 5,684,875 A | 11/1997 | Ellenberger |
| 5,696,822 A | 12/1997 | Nachenberg |
| 5,752,058 A | 5/1998 | Van De Vanter |
| 5,826,013 A | 10/1998 | Nachenberg |
| 5,919,257 A | 7/1999 | Trostle |
| 5,951,698 A | 9/1999 | Chen et al. |
| 5,956,481 A | 9/1999 | Walsh et al. |
| 5,960,170 A | 9/1999 | Chen et al. |
| 5,974,141 A | 10/1999 | Saito |
| 5,978,917 A | 11/1999 | Chi |
| 6,006,035 A | 12/1999 | Nabahi |
| 6,006,329 A | 12/1999 | Chi |
| 6,021,438 A | 2/2000 | Duvvoori et al. |
| 6,094,731 A | 7/2000 | Waldin et al. |
| 6,108,799 A | 8/2000 | Boulay et al. |
| 6,195,587 B1 | 2/2001 | Hruska et al. |
| 6,230,288 B1 | 5/2001 | Kuo et al. |
| 6,275,938 B1 | 8/2001 | Bond et al. |
| 6,418,444 B1 | 7/2002 | Raduchel et al. |
| 6,748,534 B1 | 6/2004 | Gryaznov et al. |
| 6,763,466 B1 | 7/2004 | Glover |
| 6,772,340 B1 | 8/2004 | Peinado et al. |
| 6,823,460 B1 | 11/2004 | Hollander et al. |
| 6,936,978 B2 | 8/2005 | Morgan et al. |
| 6,986,050 B2 | 1/2006 | Hypponen |
| 7,000,100 B2 * | 2/2006 | Lacombe ............ G06F 11/0757 709/203 |
| 7,020,895 B2 | 3/2006 | Albrecht |
| 7,058,822 B2 | 6/2006 | Edery et al. |
| 7,069,594 B1 | 6/2006 | Bolin |
| 7,085,928 B1 | 8/2006 | Schmid et al. |
| 7,114,185 B2 | 9/2006 | Moore et al. |
| 7,137,004 B2 | 11/2006 | England et al. |
| 7,152,164 B1 | 12/2006 | Loukas |
| 7,171,690 B2 | 1/2007 | Kouznetsov et al. |
| 7,184,554 B2 | 2/2007 | Freese |
| 7,185,015 B2 | 2/2007 | Kester et al. |
| 7,185,366 B2 | 2/2007 | Mukai et al. |
| 7,203,924 B2 | 4/2007 | Rehof et al. |
| 7,206,814 B2 | 4/2007 | Kirsch |
| 7,222,062 B2 | 5/2007 | Goud et al. |
| 7,260,717 B2 | 8/2007 | Liu |
| 7,266,845 B2 | 9/2007 | Hypponen |
| 7,290,282 B1 | 10/2007 | Renert et al. |
| 7,293,177 B2 | 11/2007 | Lahti et al. |
| 7,308,578 B2 | 12/2007 | Keohane et al. |
| 7,319,751 B2 | 1/2008 | Kirichenko |
| 7,350,204 B2 | 3/2008 | Lambert et al. |
| 7,398,389 B2 | 7/2008 | Teal et al. |
| 7,398,553 B1 | 7/2008 | Li |
| 7,480,683 B2 | 1/2009 | Thomas et al. |
| 7,487,495 B2 | 2/2009 | Usov |
| 7,516,489 B2 | 4/2009 | Lahti |
| 7,529,374 B2 | 5/2009 | Huttunen |
| 7,533,131 B2 | 5/2009 | Thomas et al. |
| 7,539,828 B2 | 5/2009 | Lomnes |
| 7,565,549 B2 * | 7/2009 | Satterlee ................. G06F 21/51 713/161 |
| 7,587,676 B2 | 9/2009 | Gomez et al. |
| 7,606,821 B2 | 10/2009 | Leahy et al. |
| 7,634,806 B2 | 12/2009 | Zinda et al. |
| 7,698,744 B2 | 4/2010 | Fanton et al. |
| 7,712,135 B2 | 5/2010 | Steinberg |
| 7,716,495 B2 | 5/2010 | Shupak et al. |
| 7,853,689 B2 | 12/2010 | Enderby |
| 7,870,387 B1 | 1/2011 | Bhargava et al. |
| 7,895,573 B1 | 2/2011 | Bhargava et al. |
| 7,930,284 B2 | 4/2011 | Leahy et al. |
| 7,984,304 B1 | 7/2011 | Waldspurger et al. |
| 8,082,585 B1 | 12/2011 | Givonetti |
| 8,166,304 B2 | 4/2012 | Murase et al. |
| 8,214,977 B2 | 7/2012 | Szor |
| 8,266,676 B2 | 9/2012 | Hardjono et al. |
| 8,272,058 B2 | 9/2012 | Brennan |

(56) References Cited

U.S. PATENT DOCUMENTS

| | | | |
|---|---|---|---|
| 8,307,437 | B2 | 11/2012 | Sebes et al. |
| 8,321,932 | B2 | 11/2012 | Bhargava et al. |
| 8,332,946 | B1 | 12/2012 | Boisjolie et al. |
| 9,075,984 | B2 | 7/2015 | Fanton et al. |
| 2002/0070272 | A1 | 6/2002 | Gressel et al. |
| 2002/0073330 | A1 | 6/2002 | Chandnani et al. |
| 2002/0099952 | A1 | 7/2002 | Lambert et al. |
| 2002/0129277 | A1 | 9/2002 | Caccavale |
| 2002/0178374 | A1 | 11/2002 | Swimmer et al. |
| 2003/0074574 | A1 | 4/2003 | Hursey et al. |
| 2003/0135756 | A1 | 7/2003 | Verma |
| 2003/0135791 | A1 | 7/2003 | Natvig |
| 2003/0159070 | A1 | 8/2003 | Mayer et al. |
| 2003/0172167 | A1 | 9/2003 | Judge et al. |
| 2003/0177394 | A1 | 9/2003 | Dozortsev |
| 2003/0212902 | A1 | 11/2003 | Van de Made |
| 2004/0015712 | A1 | 1/2004 | Szor |
| 2004/0015962 | A1 | 1/2004 | Carbone et al. |
| 2004/0034794 | A1 | 2/2004 | Mayer et al. |
| 2004/0044906 | A1* | 3/2004 | England ............... G06F 21/53 726/18 |
| 2004/0098607 | A1 | 5/2004 | Alagna et al. |
| 2004/0153644 | A1 | 8/2004 | McCorkendale et al. |
| 2004/0153918 | A1 | 8/2004 | Tanaka et al. |
| 2004/0158730 | A1 | 8/2004 | Sarkar |
| 2004/0158734 | A1 | 8/2004 | Larsen |
| 2004/0172551 | A1 | 9/2004 | Fielding et al. |
| 2004/0187023 | A1 | 9/2004 | Alagna et al. |
| 2004/0193953 | A1 | 9/2004 | Callahan et al. |
| 2004/0199763 | A1 | 10/2004 | Freund |
| 2004/0205167 | A1 | 10/2004 | Grumann |
| 2004/0225877 | A1 | 11/2004 | Huang |
| 2004/0243829 | A1 | 12/2004 | Jordan |
| 2004/0255163 | A1 | 12/2004 | Swimmer et al. |
| 2005/0005101 | A1 | 1/2005 | Yenduri |
| 2005/0021971 | A1 | 1/2005 | Patankar et al. |
| 2005/0022018 | A1 | 1/2005 | Szor |
| 2005/0060566 | A1 | 3/2005 | Chebolu et al. |
| 2005/0060581 | A1 | 3/2005 | Chebolu et al. |
| 2005/0065935 | A1 | 3/2005 | Chebolu et al. |
| 2005/0066290 | A1 | 3/2005 | Chebolu et al. |
| 2005/0102601 | A1 | 5/2005 | Wells |
| 2005/0108516 | A1 | 5/2005 | Balzer et al. |
| 2005/0108562 | A1 | 5/2005 | Khazan |
| 2005/0120242 | A1 | 6/2005 | Mayer et al. |
| 2005/0149726 | A1 | 7/2005 | Joshi et al. |
| 2005/0166268 | A1 | 7/2005 | Szor |
| 2005/0246522 | A1 | 11/2005 | Samuelsson et al. |
| 2005/0262558 | A1 | 11/2005 | Usov |
| 2006/0095971 | A1 | 5/2006 | Costea et al. |
| 2006/0130141 | A1 | 6/2006 | Kramer et al. |
| 2006/0147043 | A1 | 7/2006 | Mann et al. |
| 2006/0150256 | A1 | 7/2006 | Fanton et al. |
| 2006/0174344 | A1 | 8/2006 | Costea et al. |
| 2006/0242685 | A1 | 10/2006 | Heard et al. |
| 2007/0028110 | A1 | 2/2007 | Brennan |
| 2007/0180509 | A1* | 8/2007 | Swartz ............... G06F 9/4406 726/9 |
| 2007/0208689 | A1 | 9/2007 | Park |
| 2009/0038011 | A1 | 2/2009 | Nadathur |
| 2009/0249064 | A1 | 10/2009 | De Atley et al. |
| 2010/0287620 | A1 | 11/2010 | Fanton et al. |
| 2011/0029772 | A1 | 2/2011 | Fanton et al. |
| 2011/0087692 | A1 | 4/2011 | Masone |
| 2011/0167050 | A1 | 7/2011 | Fanton et al. |
| 2011/0167260 | A1 | 7/2011 | Fanton et al. |
| 2011/0167261 | A1 | 7/2011 | Fanton et al. |
| 2012/0030731 | A1 | 2/2012 | Bhargava et al. |
| 2012/0030750 | A1 | 2/2012 | Bhargava et al. |
| 2012/0072725 | A1 | 3/2012 | Fanton et al. |
| 2012/0078863 | A1 | 3/2012 | Fanton et al. |
| 2012/0191972 | A1 | 7/2012 | Fanton et al. |
| 2013/0297946 | A1 | 11/2013 | Fanton et al. |
| 2014/0075187 | A1 | 3/2014 | Fanton et al. |
| 2014/0082355 | A1 | 3/2014 | Fanton et al. |
| 2014/0181511 | A1 | 6/2014 | Fanton et al. |
| 2015/0026463 | A1 | 1/2015 | Fanton et al. |
| 2015/0193614 | A1 | 7/2015 | Fanton et al. |

OTHER PUBLICATIONS

Non-Final Rejection for U.S. Appl. No. 13/305,740 mailed Apr. 13, 2012.

Notice of Allowance for U.S. Appl. No. 13/438,799 mailed Apr. 26, 2013.

Non-Final Rejection or U.S. Appl. No. 13/438,799 mailed Mar. 14, 2013.

Notice of Allowance for U.S. Appl. No. 13/912,454 mailed Sep. 27, 2013.

Non-Final Rejection or U.S. Appl. No. 13/912,454 mailed Sep. 19, 2013.

Notice of Allowance for U.S. Appl. No. 14/083,087 mailed Jun. 24, 2014.

Non-Final Rejection for U.S. Appl. No. 14/083,087 mailed Jun. 9, 2014.

Notice of Allowance for U.S. Appl. No. 14/084,333 mailed Jul. 8, 2014.

Non-Final Rejection or U.S. Appl. No. 14/084,333 mailed Jun. 26, 2014.

Notice of Allowance for U.S. Appl. No. 14/139,767 mailed Jul. 29, 2014.

Non-Final Rejection for U.S. Appl. No. 14/139,767 mailed Aug. 181, 2014.

Notice of Allowance for U.S. Appl. No. 14/1155,218 mailed Jul. 29, 2014.

Non-Final Rejection for U.S. Appl. No. 14/1155,218 mailed Jul. 31, 2014.

Notice of Allowance for U.S. Appl. No. 11/296,094 mailed Mar. 11, 2010.

Non-Final Rejection for U.S. Appl. No. 11/296,094 mailed Jun. 19, 2009.

Notice of Allowance for U.S. Appl. No. 12/758,793 mailed Nov. 17, 2010.

Non-Final Rejection for U.S. Appl. No. 12/758,793 mailed Sep. 20, 2010.

Notice of Allowance for U.S. Appl. No. 12/905,193 mailed Sep. 21, 2011.

Non-Final Rejection for U.S. Appl. No. 12/905,193 mailed Aug. 16, 2011.

Kim et al., The Design and Implementation of Tripwire: A File System Integrity Checker. 1993. Retrieved from the Internet <URL:docs.lib.purdue.edu/cgi/viewcontent.cgi?article=2083&context=cstech>. pp. 1-23.

Ionescu, Introduction to NT Internals 2004. Retrieved from the Internet. <URL:alex-ionescu.com/part1.pdf> pp. 1-122.

NativeAPI. System Information and Control. 1999. Retrieved from the Internet <URL:ivanlef0u.fr/repo/ebooks/Windows%202000%20native%20API%20reference.pdf> pp. 1-5.

Zhou., "The Multiple-queue Replacement Algorithm for Second Level Buffer Caches." 2001. Retrieved from the Internet <URL:citeseerx.ist.psu.edu/viewdocs/summary?doi=10.1.1.3.421> pp. 1-14.

Notice of Allowance for U.S. Appl. No. 13/045,781 mailed Feb. 27, 2012.

Non-Final Rejection for U.S. Appl. No. 13/045,781 mailed Feb. 8, 2012.

Non-Final Rejection for U.S. Appl. No. 14/546,150 mailed May 7, 2015.

Notice of Allowance or U.S. Appl. No. 14/546,150 mailed Nov. 20, 2015.

Notice of Allowance (Supp) or U.S. Appl. No. 14/546,150 mailed Dec. 24, 2015.

Sophos Inc. and Sophos Ltd's Disclosure of Invalidity Contentions and Document Production Pursuant to Patent L.R. 3-3 and 3-4. Case No. 3:13-cv-05831-EMC.

(56) References Cited

OTHER PUBLICATIONS

Exhibit A1 U.S. Pat. No. 7,698,744 in view of Preventing the Execution of Unauthorized Win32 Applications, published Jun. 12, 2001.
Exhibit A2 U.S. Pat. No. 7,698,744 in view of U.S. Pat. No. 7,085,928, published Aug. 2, 2006.
Exhibit A3 U.S. Pat. No. 7,698,744 in view of DigSig: Run-time Authentication of Binaries at Kernel Level, published Nov. 14, 2004.
Exhibit A4 U.S. Pat. No. 7,698,744 in view of U.S. Pat. No. 6,195,587 published Apr. 28, 1994.
Exhibit A5 U.S. Pat. No. 7,698,744 in view of U.S. Pat. No. 7,984,304, published Jul. 19, 2011.
Request for Ex Parte Reexamination filed Jun. 18, 2015. Reexamination Control No. 90/013,533. 129 pgs.
Office Action in Ex Parte Reexamination mailed Oct. 7, 2015. Reexamination Control No. 90/013,533. 14 pgs.
Beattie_CryptoMark-Locking_the_Stable_Door. Jul. 2000. 7 pgs.
Arbaugh, W. Chaining Layered Integrity Checks. 1999. 132 pgs.
Belani, E., et al. Crisis Wide Area Security Architecture. 15 pgs.
DigSig Run-Runtime Authentication of Binaries at Kernel Level. 13 pgs.
Iglio, P., et al. Trusted Box: A Kennel Level Integrity Checker. 10 pgs.
Gosh, A., et al. Execution Control Lists: An Approach to Defending Against New and Unknown Malicious Software. 4 pgs.
Spencer, R. et al., The Flask Security Architecture: System Support for Diverse Security Policies. 17 pgs.
Jiang, S. et al., ULC: A File Block Placement and Replacement Protocol to Effectively Exploit Hierarchical Locality in Multi-level Buffer Caches. 10 pgs.
Using Software Restriction Policies to Protect Against Unauthorized Software. 25 pgs.
Williams, M., Anti-Trojan and Trojan Detection with In-Kernel Digital Signature testing of Executables. Apr. 16, 2002. 12 pgs.
LF Friedrich, A Parallel/distributed Implementation Environment; Year: 1997; IEEE; pp. 61-67.
Enterprise Application Whitelisting, "Achieving PCI Compliance at the Point of Sale Using Bit9 ParityTM to Protect Cardholder Data." Bit9Parity. 5 pages. www.bit9.com.
Enterprise Application Whitelisting, "What is That Application?" Bit9Parity. 2 pages. www.bit9.com.
Ogren, E., "The Tenets of Endpoint Control." Ogren Group. 7 pages, 2008.

"Faronics Anti-Executable Enterprise." Faronics Anti-Executable.TM.. Oct. 2009. 4 pages.
"Faronics Anti-Executable Standard." Faronics Anti-Executable.TM.. Oct. 2009. 3 pages.
"Blacklist Versus Whitelist Software Solutions." Faronics. Aug. 2005. 6 pages.
"User Guide." Faronics Anti-Executable.TM. Enterprise. Aug. 2009. 67 pages.
"F-Secure DeepGuard.TM.—A Proactive Response to the Evolving Threat Scenario." F-Secure. Nov. 2006. 11 pages.
"F-Secure DeepGuard.TM. 2.0." F-Secure. Sep. 2008. 13 pages.
Leyden, J., "SecureWave Revamps Alternative to Desktop AV [printer-friendly] .cndot. The Register." http://www.theregister.co.uk/2004/03/30/securewave.sub.--revamps.sub.--al-ternative.sub.-to.sub.-desktop/pri . . . Mar. 2004. 2 pages.
Solidcore S3 Control—Embedded. Certification Report. NSS Labs. Sep. 2008. 32 pages.
"Prevx 3.0." PC Magazine. www.pcmag.com. May 2009. 3 pages.
"Bouncer by CoreTrace.TM.—High-Security / Easy-Change Application Whitelisting." coreTrace. 4 pages, 2009.
True Endpoint Security—A Matter of 180 degrees. coreTrace. Jul. 2008. 9 pages.
"White Paper: Application Whitelisting and Energy Systems—A Good Match?" coreTrace, 6 pages, 2009.
"Bouncer by CoreTraceTM—Provides True Endpoint Security with Rapid Breakeven." coreTrace. Jul. 2008. 10 pages.
"Regulatory Compliance Protecting PCI Systems and Data." coreTrace. 2 pages, 2009.
"CoreTrace Continues to Knock Down Application Whitelisting Barriers." EMA. 3 pages, 2009.
Notice of Allowance for U.S. Appl. No. 14/487,348 mailed May 18, 2015.
Non-Final Rejection for U.S. Appl. No. 14/487,348 mailed Mar. 26, 2015.
Final Rejection for U.S. Appl. No. 13/023,372 mailed Sep. 28, 2012.
Non-Final Rejection for U.S. Appl. No. 13/023,372 mailed Apr. 2, 2012.
Final Rejection for U.S. Appl. No. 13/029,119 mailed Apr. 26, 2012.
Non-Final Rejection for U.S. Appl. No. 13/029,119 mailed Dec. 1, 2011.
Non-Final Rejection for U.S. Appl. No. 13/032,001 mailed Oct. 27, 2011.
Non-Final Rejection for U.S. Appl. No. 13/312,123 mailed Feb. 16, 2012.

* cited by examiner

SECURE SYSTEM FOR ALLOWING THE EXECUTION OF AUTHORIZED COMPUTER PROGRAM CODE

CROSS-REFERENCE TO RELATED APPLICATIONS

This application is a continuation of U.S. patent application Ser. No. 14/981,262, filed Dec. 28, 2015, which is a continuation of U.S. patent application Ser. No. 14/546,150, filed Nov. 18, 2014, now U.S. Pat. No. 9,305,159, which is a continuation of U.S. patent application Ser. No. 14/487,348, filed Sep. 16, 2014, now, U.S. Pat. No. 9,075,984, which is a continuation of U.S. patent application Ser. No. 14/155,218, filed Jan. 14, 2014, now U.S. Pat. No. 8,850,193, which is a continuation of U.S. patent application Ser. No. 14/083,087, filed Nov. 18, 2013, now U.S. Pat. No. 8,813,230, which is a continuation of U.S. patent application Ser. No. 13/912,454, filed on Jun. 7, 2013, now U.S. Pat. No. 8,589,681, which is a continuation of U.S. patent application Ser. No. 13/438,799, filed on Apr. 3, 2012, now U.S. Pat. No. 8,464,050, which is a continuation of U.S. patent application Ser. No. 13/045,781, filed on Mar. 11, 2011, now U.S. Pat. No. 8,151,109, which is a continuation of U.S. patent application Ser. No. 12/905,193, filed on Oct. 15, 2010, now U.S. Pat. No. 8,069,487, which is a continuation of U.S. patent application Ser. No. 11/296,094, filed on Dec. 5, 2005, now U.S. Pat. No. 7,698,744, which claims the benefit of U.S. Provisional Application No. 60/633,272, filed on Dec. 3, 2004, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2004-2016, Fortinet, Inc.

BACKGROUND

Field

Various embodiments of the present invention generally relate to systems and methods for protecting computer systems and networks from unauthorized code execution. More specifically, embodiments of the present invention provide for systems and methods of securing computer systems of subscribers to a cloud-based whitelist of a trusted service provider by allowing only the execution of authorized computer program code.

Description of the Related Art

The execution of unauthorized software has had a serious impact on computer users. The impact of unauthorized software execution not only applies to malicious software, or malware, but also the use of unlicensed software and software which may distract employees from working, such as music players, games, and/or the like.

Current approaches to dealing with these issues have proven ineffective. One common method of virus or malware detection is through the use of system scans either initiated by the user or automatically schedule on a periodic basis. During the scanning, the malicious software detector may search for traces of a virus or other malware using a database of know malware signatures. However, such databases must be routinely updated and have generally proven ineffective against the next variation of the virus.

Another common approach to dealing with malicious software execution is real-time background system monitoring. Typically, this approach continuously monitors all incoming and outgoing files from the computer system in order to determine any association with known malicious software. Again, many of these approaches use a signature-based approach which is ineffective against the next variation of the malicious software.

SUMMARY

Systems and methods are described for selective authorization of code modules. According to one embodiment, a kernel-level driver within a kernel of an operating system of a computer system intercepts activity in connection with a file system associated with the computer system or the operating system relating to a code module. A determination is made by the kernel-level driver regarding whether to allow the intercepted activity to proceed by performing a real-time authentication process of the code module with reference to a multi-level whitelist database architecture, including a local copy of a remote global whitelist database hosted by a trusted their-party service provider, a local whitelist database and a most recently used (MRU) cache. When the intercepted activity is allowed to proceed as a result of the determination, the code module is permitted by the kernel-level driver to be loaded and executed by the computer system.

Other features of embodiments of the present invention will be apparent from the accompanying drawings and from the detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
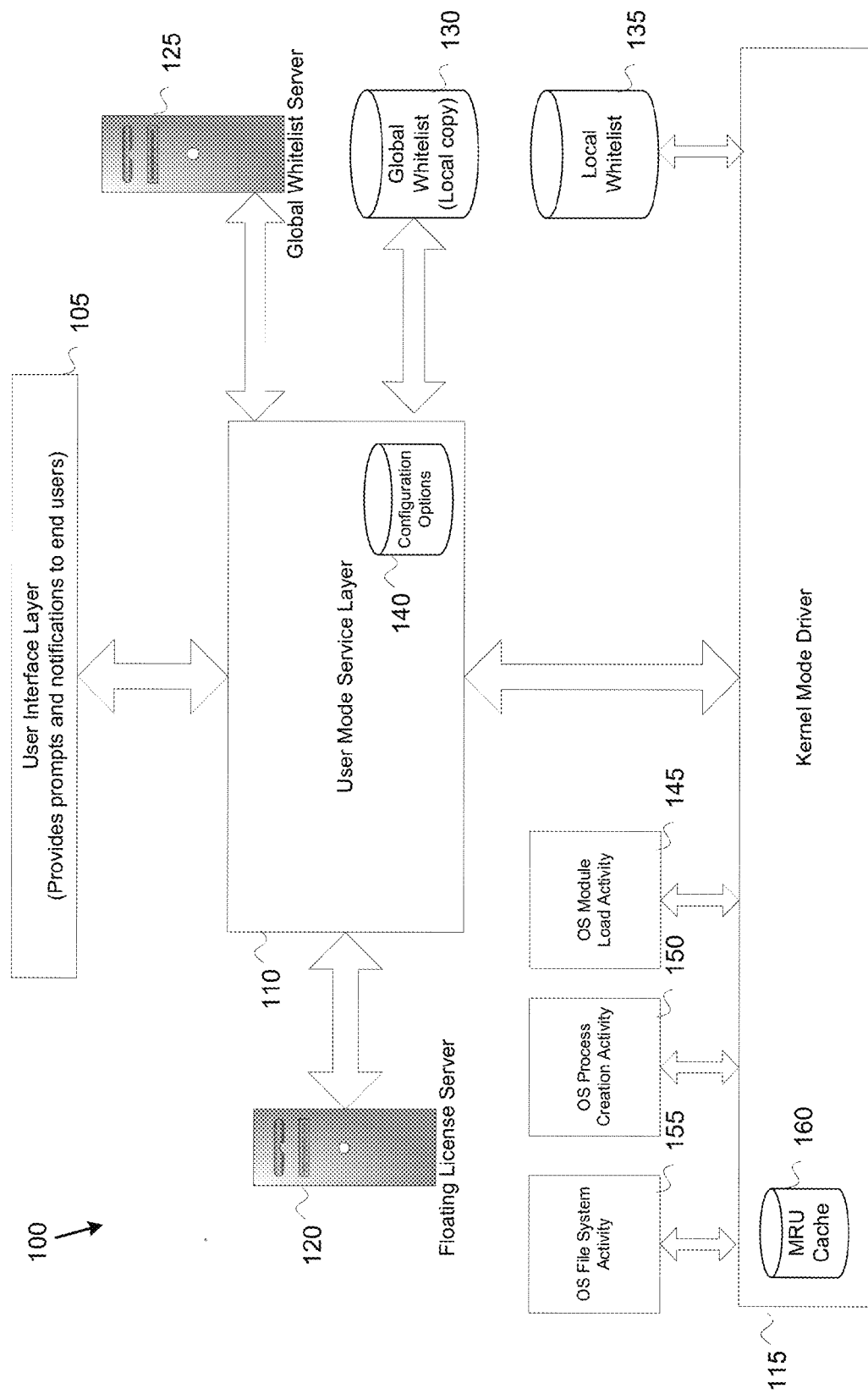
FIG. 1 is a high level architectural diagram of a multi-level whitelist authentication system for allowing the execution of authorized computer code in accordance with one embodiment of the present invention.

Embodiments of the present invention generally relate to systems and methods for selective authorization of code modules. According to one embodiment, a proactive whitelist approach is employed to secure a computer system by allowing only the execution of authorized computer program code thereby protecting the computer system against the execution of malicious code such as viruses, Trojan horses, spy-ware, and/or the like.

Various embodiments use a kernel-level driver, which intercepts or "hooks" certain system Application Programming Interface (API) calls in order to monitor the creation of processes prior to code execution. The kernel-level driver may also intercept and monitor the loading of code modules by running processes, and the passing of non-executable code modules, such as script files, to approved or running code modules via command line options, for example. The kernel-level driver makes decisions regarding whether to allow code modules to be loaded (e.g., mapped into memory) and/or executed based on whether the code modules are "approved" as described in more detail below.

In one embodiment of the present invention, a kernel mode driver intercepts and monitors the loading of dependent code modules by running processes. In some instances, the loading of a dependent code module by a running process represents an attempt by the running process to load and execute the dependent code module within the address space of the running process. In other instances, the loading of a dependent code module by a running process represents the passing of a non-executable code module to the running module. Dependent code modules may include code modules that can be loaded and executed from within an existing process (e.g., modules with a .dll extension) or non-executable code modules (e.g., script files) that can be passed to a running process (e.g., a script interpreter). According to one embodiment, the kernel mode driver may take into consideration in connection with allowing or denying the loading of the dependent code module, the identity or type of the code module or running process that initiated the load request at issue. If the running process is a script interpreter, for example, then the dependent code module may be authenticated with reference to a multilevel whitelist architecture; however, if the running process is a text editor, then authentication of the dependent code module may be bypassed as there is no intent to run the script.

Various embodiments make use of a user-level service to augment the processing provided by the driver. Certain tasks, such as network communication, are much more easily implemented in user-level code than in a driver. While it is possible to implement all of the functionality of this system in the driver, the preferred embodiment divides processing between a user-level service process and the driver-level generally along the lines of performing the most time sensitive operations directly in the driver and performing the more complex operations at user-level.

Various features and/or advantages may be provided by one or more embodiments of the present invention. These features and/or advantages may include the following: providing a secure system for limiting the execution of computer program code to only that executable code which can be verified to be approved to run on that computer; and systems and methods for protecting a computer system from attack by unauthorized or malicious users or software attempting to modify the various whitelist databases or otherwise spoof the system such that unauthorized code would be allowed to run.

According to one embodiment, a software package may be provided which performs one or more of the methods described herein. During the installation of the software on a computer system, the software modules (e.g., one or more of the kernel mode driver, OS file system activity monitor, OS process creation activity monitor, OS module load activity monitor, user mode service layer and user interface layer, etc. described below) are also installed. In some embodiments, a current copy of a global whitelist may be installed locally on the computer system. In addition, according to one embodiment, an inventory of the user's hard drive may be performed during which a content authenticator may be created for each code module. For example, code modules may include, but need not be limited to, files containing executable code, script files, batch files, dynamically-linked libraries (DLLs), executables, and/or the like.

According to one embodiment, protection is not just limited to traditional executable modules but also extends to many kinds of 'script' command/data files. The content authenticator may be compared to those contained in one or more whitelists of varying scope. For example, some embodiments may use a multi-level whitelist architecture including one or more MRU caches, one or more global whitelists, and/or one or more local whitelists.

According to one embodiment, one or more whitelists may be protected by a digital signature of its own contents. The digital signature may be based in part upon a hash value for the data in the whitelist. This signature may then be encrypted remotely by a Remote Signing Server (RSS) using public key cryptography. Then, each time one or more of the whitelists are read into memory to look up a value during normal operation, the hash value may be recalculated by the authentication system software, and compared to the unencrypted stored value (unencrypted using the public key). If the two hash values compare equally, then it can be reasonably assured that the authenticated whitelist has not been modified maliciously.

In one embodiment, the RSS may be used to encrypt hash values of the whitelists using Public Key Infrastructure (PKI) encryption, for example. The RSS may host a secret (private) encryption key that it uses to encrypt values sent to it by client installations that are in need of modifying their database. Later a public key may be used to decrypt the value for comparison against calculated values allowing the code to determine if any of the data has been modified.

Some embodiments additionally provide for a client verification scheme. According to one embodiment, the RSS verifies that a client making a signature request is indeed an actual approved instance of the authentication system software, and not a hacker or someone attempting to spoof the RSS. In order to do so, the system may make use a variety of identifying information from the requestor to make that determination. For example a machine ID, a password, and/or the like may be used. A machine ID is a unique identifier (number) that is generated at the time of authentication system software installation on an end user computer or server. It may contain a globally unique identifier (GUID) in combination with some other values that uniquely identify the computer system that the client code was installed on (including possibly a CPU serial number, a network card unique media access control (MAC) address, and/or various other system information).

Various embodiments of the present invention may be used in either a personal setting or within in a corporate network environment. The basic technology for allowing/denying the execution of certain code modules is useful for other purposes. In this manifestation, the user may not have any control over approving or denying particular modules, but the IT manager or department may. Instead of relying on a truly global whitelist, a custom whitelist database may be created and maintained by the IT department. General operation of such an authentication system is similar; however, less emphasis is given to an individual user's ability to locally approve/reject modules.

In an enterprise setting, to better support centralized control over which modules are allowed to execute, it is anticipated that the authentication system would include a 'management console' and that the authentication system software is capable of being controlled/configured/updated via remote control. Also, in this environment it is desirable that the authentication system software be able to interface with other enterprise management tools. Therefore, in one embodiment, the authentication system software may be equipped with a remote control port to support such operations. Remote control of the authentication system software may be subject to validation/authentication techniques to insure that only approved management consoles can control the authentication system software.

In addition to malware protection, other purposes and uses for a corporate version of the authentication system software may include additional features, such as one or more of: the ability to manually limit allowed applications on workstations within the network; the ability to monitor and track software use activity; software license management; software use management, and/or the ability to aggregate data from many computers on a network about how many copies of a certain software application are being used at any one time.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, various embodiments of the present invention may be described with reference to a proactive malware protection methodology implemented within a Microsoft® Windows® kernel mode driver, the present invention is equally applicable to various other operating system environments and other applications in which monitoring and/or enforcement of software activity is desired. For example, according to one embodiment, techniques described herein may be used to monitor and track software use activity by logging the execution and use of all or selected types or categories of modules on a computer system or network. Additionally, various of the methodologies described herein may be used to enforce and monitor floating licenses for software applications by limiting the number of concurrent users of a particular software application. Various other usage scenarios, such as copy enforcement, software/application use management, and/or the like, for a system as described herein will be apparent to those of ordinary skill in the art For the sake of illustration, various embodiments of the present invention have herein been described in the context of computer programs, physical components, and logical interactions within modern computer networks. Importantly, while these embodiments describe various aspects of the invention in relation to modern computer networks and programs, the method and apparatus described herein are equally applicable to other systems, devices, and networks as one skilled in the art will appreciate. As such, the illustrated applications of the embodiments of the present invention are not meant to be limiting, but instead exemplary. Other systems, devices, and networks to which embodiments of the present invention are applicable include, but are not limited to, other types communication and computer devices and systems. More specifically, embodiments are applicable to communication systems, services, and devices such as cell phone networks and compatible devices. In addition, embodiments are applicable to all levels of computing from the personal computer to large network mainframes and servers as well as being applicable to local area networks (LANs) and wide area networks (WANs), such as enterprise-wide networks.

TERMINOLOGY

Brief definitions of terms, abbreviations, and phrases used throughout this application are given below.

The phrase "code module" generally refers to any file that contains information that may be interpreted by a computer system. Examples of code modules include executable objects, file system objects, data files, text files, script files and/or the like. Furthermore, code module objects, such as visual basic scripts, JavaScript, Windows-based scripts, Java applets, and/or the like, are intended to be encompassed by the phrase "code module." Common file extensions of executable objects include, but are not limited to, .exe, .com, .sys, .dll, .scr, .cpl, .api, .drv, .bpl and/or the like. File system objects include objects like device drivers, network interfaces, and/or the like. Other examples of code modules may include files using the IEEE-695 standard, S-records, PEF/CFM Mach-O (NeXT, Mac OS X), a .out (Unix/Linux), COFF (Unix/Linux), ECOFF (Mips), XCOFF (AIX), ELF (Unix/Linux), Mach-O (NeXT, Mac OS X), Portable Executable, IBM 360 object format, NLM, OMF, SOM (HP), XBE (Xbox executable), and/or the like.

The terms "connected" or "coupled" and related terms are used in an operational sense and are not necessarily limited to a direct physical connection or coupling. Thus, for example, two devices may be couple directly, or via one or more intermediary media or devices. As another example, devices may be coupled in such a way that information can be passed therebetween, while not sharing any physical connection on with another. Based on the disclosure provided herein, one of ordinary skill in the art will appreciate a variety of ways in which connection or coupling exists in accordance with the aforementioned definition.

The phrase "content authenticator" generally refers to a result of a method for generating an authenticating mark which may be used in verifying digital information, files, code and/or data segments of code modules and/or the like. For example, in some cases a method of content authentication comprises two complimentary algorithms. One for generating the authenticating mark and one for verifying the authenticating mark. In one embodiment, a digital signature is employed as the content authenticator. A digital signature or cryptographic digital signature denotes the result of computing a cryptographic hash value, such as a Secure Hash Algorithm (e.g., SHA-1, SHA-256), Message Digest #5 (MD-5), and the like, over a specific body of encoded data, then encrypting the hash value using a private key. Given the same body of encoded data, re-computing the hash value, and decrypting the digital signature using the corresponding public key, will produce the identical value if the encoded data remains the same. According to one embodiment, in an effort to increase real-time performance, content authenticators may be generated and validated for only the code segment of a code module representing an executable. In other embodiments, the content authenticators may cover both the code and data segments of code modules representing executables.

The phrase "global whitelist" generally refers to a whitelist identifying commonly accepted code modules that are approved for execution. In one embodiment, a global whitelist is a list of all known approved code modules, not limited to those existing on any one particular computer system. According to various embodiments, the global whitelist may be provided by a source external to the organization, enterprise or individual end user or group of end users whose code modules are whitelisted. In some embodiments, a trusted service provider may maintain a global whitelist and allow local copies of the global whitelist to be stored on computer systems associated with a registered user of the trusted service provider. In other embodiments, the global whitelist may exist only in one or more protected servers and is not distributed in the form of local copies. In one embodiment, the global whitelist may be populated with a truly "global" list of all known safe code modules as identified by multiple sources. In other embodiments, the global whitelist may be edited and/or created by an administrator based on an enterprise-, division-, development group-wide software policy, for example. In addition, according to various embodiments, the global whitelist database may be updated on a periodic schedule such as yearly, monthly, weekly, etc. or on an as needed basis. In an enterprise network, for example, the global whitelist database might contain a limited subset of known good code modules that are approved for use with the particular enterprise. As an example, a global whitelist may identify code modules associated with common operating system software, operating system services, and common utilities such as word processors, internet browsers, and/or the like. In addition, a global whitelist database may contain one or more fields that contain various information about the code module or the entry in the global whitelist. For example, in some cases the fields may include one or more of the following: a content authenticator, a file name and/or a file path, information identifying the user or process that created and/or last edited the entry, a run option, additional flags describing what processing should occur for this entry such as an "interpreter" flag, a time stamp, and/or the like. In some embodiments, the run option for a given entry can encode more information and indicate a wider range of processing than just allow. Thus, it is understood that "whitelist" as used in accordance with various embodiments stores more than just the list of authenticators that are valid; it should be understood to have the broader meaning of the list of authenticators for which it is desired to perform some specific processing (e.g., deny, prompt, etc).

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

The phrase "local whitelist" generally refers to a whitelist which identifies code modules which have been locally approved for execution on one or more computer systems or a whitelist that has otherwise been customized for use by one or more particular computer systems. The local/global qualifier when used in connection with the term whitelist does not necessarily refer to where the whitelist is stored, but rather is intended to refer to the size, scope or quantity of entries in the whitelist. Typically, a global whitelist would be expected to be more comprehensive than a local whitelist. In one embodiment, the local whitelist may be stored in a memory store. In contrast to global whitelists, a local whitelist allows for a more specific customization of the computer software which may be run on an individual computer, thereby allowing an administrator to tailor a local whitelist to allow or disallow particular code modules. According to various embodiments, a local whitelist database may contain entries for files known to be installed on one or more computer systems. For example, according to some embodiments, a local whitelist may be created by a computer lock down procedure that scans one or more local computers for code modules which are then added to the local whitelist database. In other embodiments, an end user or administrator may be authorized to add or remove entries indicating which code modules are allowed to execute and/or load. The entries found within a local whitelist, according to some embodiments, may consist of a content authenticator value, file name and/or file path information, run-options and flags. Flags can contain information, such as whether the corresponding code module is a script interpreter, or whether the code module is being monitored by a floating license server. In each case, it should be understood that the terms local whitelist and global whitelist do not necessarily imply separate file storage. Indeed, the local and global entries, at least according to some embodiments, could all be stored in a single file with an appropriate flag on each entry indicating its local/global status. Such statuses are important for being able to properly update the locally stored lists from external sources.

If the specification states a component or feature "may", "can", "could", or "might" be included or have a characteristic, that particular component or feature is not required to be included or have the characteristic.

The phrases "memory store" or "data store" generally refer to any device, mechanism, or populated data structure used for storing information. For purposes of this patent application, "memory store" or "data store" are intended to encompass, but are not limited to, one or more databases, one or more tables, one or more files, volatile memory, nonvolatile memory and dynamic memory. By way of further illustration, for example, random access memory, memory storage devices, and other recording media are covered by the phrase "memory store" or "data store." Common examples of a memory store include, but are not limited to, magnetic media such as floppy disks, magnetic tapes, hard drives and/or the like. Other examples of "memory stores" include SIMMs, SDRAM, DIMMs, RDRAM, DDR RAM, SODIMMS, optical memory devices such as compact disks, DVDs, and/or the like. In addition, a "memory store" may include one or more disk drives, flash drives, databases, local cache memories, processor cache memories, relational databases, flat databases, and/or the like. This list is no way meant to be an exhaustive list of devices and/or data structures falling with in the definition of "memory store," but is instead meant to highlight some examples. Those skilled in the art will appreciate many additional devices and techniques for storing information which are intended to be included within the phrase "memory store."

The phrase "MRU cache" or "most recently used cache" generally refers to a most recently used list of code modules that have been requested or themselves have requested to be loaded or mapped into memory or to create a process. In one embodiment, the MRU cache is used to efficiently identify authorized and/or unauthorized code modules without having to recalculate a content authenticator associated with the code modules as the code module has relatively recently already been authenticated. Accordingly, new entries may be added to the MRU cache as code modules are authenticated and then allowed or disallowed to load or execute. In some embodiments, the MRU cache is an in-memory list of code module file path names (identifying EXEs, DLLs, Scripts, etc.) and associated run-options for the corresponding file path names. According to various embodiments, the MRU cache may be updated when a kernel-level driver intercepts file system write activity for any of the files identified in the MRU cache. As such, the cache entry for the particular file may be removed from the list or otherwise invalidated to preclude a file that may have been modified by being authenticated based on the MRU cache. Other embodiments provide for the MRU cache may be stored in any memory store. The use of a MRU cache may provide a significant performance enhancement by allowing the kernel-level driver to bypass the steps of having to calculate and look up the content authenticator associated with the code module in one or more of the higher-level whitelists each time a code module is loaded into memory.

The phrase "multi-level whitelist" general refers to a whitelist architecture in which a hierarchical whitelist approach with multiple whitelists of varying scope and/or an MRU cache are employed. Accordingly, a priority is created that governs the order in which the whitelists and caches are checked. Some embodiments of a multi-level whitelist may use one or more of MRU caches, one or more local whitelist databases, and/or one or more global whitelist databases.

The term "responsive" includes completely or partially responsive.

The phrase "run options" generally refers to an indicator associated with one or more code modules of whether a code module should be unconditionally allowed to execute, unconditionally denied to execute, or if more information is required before a decision can be made about the execution of the code module. In some embodiments, a run option may indicate that a license check is required, administrator approval is required, that the code module may be allowed if certain conditions are met, or that the code module should be disallowed under certain conditions. For example, a music player or instant message application may be associated with a run option that will only allow execution of the code modules after work hours.

The term "whitelist" generally refers to an access control mechanism that may identify a set of one or more code modules approved for execution on one or more computer systems. In some embodiments, a whitelist may also include information identifying a set of one or more code modules that are not approved for execution (e.g., blacklist information). A whitelist may be stored in a memory store or a data store resident in local memory, on a mass storage device, on a remote machine or distributed across one or more remote machines. In some embodiments, a whitelist may also contain information associated with the code modules, such as a file name or file path (e.g., a file name and/or associated extension or a fully qualified path of a file), content authenticator, special file tags, known associations, and/or the like.

Exemplary System Overview

FIG. 1 is a high level architectural diagram of a multi-level whitelist authentication system 100 for allowing the execution of authorized computer code in accordance with one embodiment of the present invention. According to the present example, the multi-level whitelist authentication system 100 includes a user interface layer 105, a user mode service layer 110 and a kernel mode driver 160.

In one embodiment, the kernel mode driver 115 interacts with and makes use of various other components, such as an OS file system activity monitor 155, an OS process creation monitor 150, an OS module load activity monitor 145 and a local whitelist 135, to perform real-time authentication of code modules. According to one embodiment, the OS file system activity monitor 155 may also be configured to monitor and protect one or more of the whitelists such as MRU cache 160, local whitelist 135, and/or global whitelist 130. In one embodiment, the kernel mode driver 115 hooks low level operating system APIs to intercept various OS operations, such as process creation, module loading, and file system input/output (I/O) activity. In this manner, the kernel mode driver 115 may perform appropriate authentication processing prior to the loading or mapping of a requested code module into memory or prior to the execution of a requested code module.

According to the present example and as will be described in further detail below, during the creation of any new processes, or the loading of a code module by an existing process, the kernel mode driver 115 can make a determination as to whether to allow the particular operation to continue (e.g., grant the request) or deny the request (e.g., by propagating an error code to the user mode service layer 110) with reference to an MRU cache 160 and the local whitelist 135.

According to one embodiment, the local whitelist 135 contains entries for files known to be resident on the local computer system or within the LAN or enterprise network. The local whitelist 135 may be stored in RAM or in a disk file. As described further below, in one embodiment, entries of the local whitelist 135 include a content authenticator value, path information, run-options and flags associated with each code module. Flags can contain information such as whether the corresponding code module is a script interpreter or whether the code module is being monitored by a floating license server, such as floating license server 120. As described further below, in accordance with a typical authentication scenario that does not include the optional cache acceleration technique (described below), responsive to a request to execute or load a code module, the multi-level whitelist authentication system 100 first attempts to authenticate the code module with reference to the local whitelist 135 (e.g., calculate a content authenticator value associated with the code module and compare the calculated value to the expected value stored in the local whitelist 135). If such authentication is inconclusive, then authentication processing continues with reference to the global whitelist 130.

As described further below, a cache acceleration technique involving the use of an optional most recently used (MRU) cache 160 facilitates real-time authentication of code modules by maintaining a relatively small set of cache entries relating to code modules that have recently been requested to execute, such as executables, dynamically-linked libraries (DLLs) and scripts. When employed, the MRU cache 160 provides significant performance enhancement by allowing the kernel mode driver 115 not to have to calculate and look up the content authenticator each time a commonly used code module is loaded.

According to one embodiment, the MRU cache 160 is an in-memory list of path names and associated run-options for the most recently requested code modules. Entries may be added to the MRU cache 160 after code modules are authenticated by other means (e.g., with reference to the local whitelist 135, the global whitelist 130, or after explicit approval by the end user or the system or network administrator). Since code modules identified by entries of the MRU cache 160 have already been recently authenticated, as long as the file associated with code module remains unaltered, there is no need to perform the time consuming process of calculating and looking up the content authenticator for the requested code module.

According to one embodiment and as described in further detail below, the kernel mode driver 115 protects the integrity of the MRU cache 160 by removing or otherwise invalidating cache entries associated with files that may have been altered. For example, when the kernel mode driver 115 intercepts file system write activity via the OS file system activity monitor 155 for any of the files in the MRU cache 160, the entry associated with the file may be removed from the list or marked as invalid to allow subsequent cache processing to overwrite the entry. Consequently, in one embodiment, if a valid entry associated with the requested code module is found in MRU cache 160, then an accelerated authentication of the requested code module may be performed by simply using the previous authentication results.

The global whitelist 130 is a list of approved code modules that is not limited to those existing on a particular computer system. According to one embodiment, the global whitelist 130 is an externally supplied knowledge base of known safe software modules that may be gathered from one or more sources. While in some implementations, the global whitelist 130 may be populated with a truly "global" list of all known safe software, it is contemplated that within an enterprise network, the global whitelist 130 might contain only a limited subset of known good software that is approved for use with the particular enterprise. In one embodiment, the global whitelist 130 contains the same fields as the local whitelist 135.

According to one embodiment, the user mode service layer 110 provides services that help make decisions about whether to allow execution of code modules that the kernel mode driver 115 cannot affirmatively authenticate. For example, if the kernel mode driver 115 cannot locate an entry for a code module in either the MRU cache 160 or the local whitelist 135, then responsibility for completing authentication of the code module may propagate up the chain to the user mode service layer 110. In the present example, configuration options 140 stored within the user mode service layer 110 may help determine the actions that are taken in these cases. For example, the configuration options 140 may include such items as whether the end user or a system or network administrator should be prompted to allow unknown code modules to execute (permissions), whether a Global Whitelist Server should be contacted to obtain approval, whether the floating license server 120 should be contacted to obtain approval, etc. In one embodiment, the user mode service layer 110 may also be responsible for logging (storing) information about the operation of the system, etc.

In the present example, the user interface layer 105 is responsible for displaying information to the end user of the computer system and/or for displaying information to a system or network administrator. This may include prompting the end user or administrator for permission to execute an unknown code module (if the configuration options 140 are set to do that) or simply notifying the user and/or administrator that a code module was denied execution as a result of the operation of the multi-level whitelist authentication system 100.

A global whitelist server 125 may be a server to which the multi-level whitelist authentication system 100 is connected over the Internet or it may be a locally hosted server in an enterprise network. In one embodiment, the global whitelist server 125 is an external source for receiving updated whitelist information. Depending upon the particular implementation, the global whitelist server 125 may allow a complete local copy to be stored with the multi-level whitelist authentication system 100 or the global whitelist server 125 may simply respond to individual code module information queries.

In embodiments in which it is desirable to enforce concurrent instance limitations on particular software applications, a floating license server 120 may be included to centrally manage the number of concurrent executions of particular code modules. According to one embodiment, the floating license server 120 may be programmed to allow a limited number of concurrent executions for certain modules. For example, when a monitored application is launched, the available license count may be decremented. When that instance of the application terminates, the floating license server 120 is notified so that it can increment the available license count.

As described further below, in one embodiment, the floating license server 120 may be queried by individual clients to determine whether licenses are available at a given time to execute the monitored application(s). If there is not an available license when one is requested, it will return that information so that the client can deny the execution at that time. Advantageously, in this manner, an application that is not otherwise provided with built in capabilities to perform license enforcement may be subjected to concurrent execution limitations as may be desired by an enterprise or otherwise contractually imposed by an application provider, for example.

In the present example, a Remote Signing Server (RSS) 165, may be used to protect one or more of the global whitelist 130, the local whitelist 135 and the MRU cache 160 with an externally generated digital signature. The digital signature may be based in part upon a hash value for the data in the corresponding whitelist. This signature may then be encrypted remotely by a Remote Signing Server (RSS) using private key encryption. Then, each time one or more of the whitelists are read into memory to look up a value during normal operation, the hash value may be recalculated by the authentication system software, and compared to the unencrypted stored value (unencrypted using the public key). If the two hash values compare equally, then it can be reasonably assured that the authenticated whitelist has not been modified maliciously.

Some embodiments additionally provide for a client verification scheme according to which a caller of the RSS 165 is confirmed to be an authorized code module associated with the authentication system software by requiring the caller to provide identifying information, such as a machine ID, a password, and/or the like.

In one embodiment, the client verification scheme employs an un-stored password (from user memory) that is used when an end-user installs the authentication system software and creates a new account on the RSS, he/she may be prompted to provide a password or phrase to the server through a web page that is never stored on the end user system. The user may then be asked to provide this password during the database signing protocol.

In addition, some embodiments provide for abuse/misuse detection. According to one embodiment, the RSS contains code to monitor requests made of it and looks for patterns of malicious use, such as repeated failed authentications from the same IP address, etc.

Exemplary Computer System Overview

Figure 2:
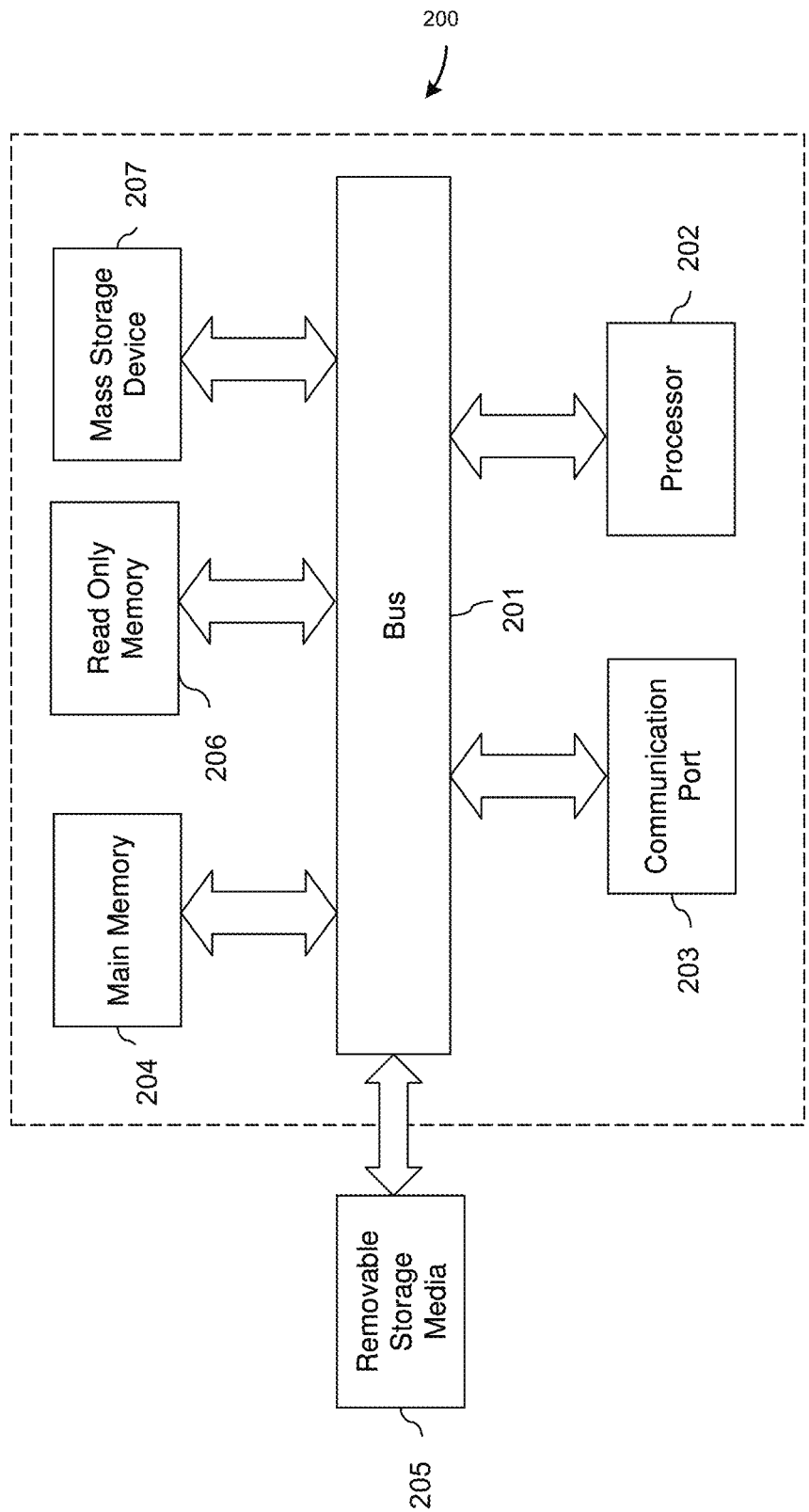
FIG. 2 illustrates an example of a computer system with which embodiments of the present invention may be utilized.

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 2 is an example of a computer system 200, such as a workstation, personal computer, client, or server, upon which embodiments of the present invention may be utilized.

According to the present example, the computer system includes a bus 201, at least one processor 202, at least one communication port 203, a main memory 204, a removable storage media 205 a read only memory 206, and a mass storage 207.

Processor(s) 202 can be any know processor, such as, but not limited to, an Intel® Itanium® or Itanium 2® processor(s), or AMD® Opteron® or Athlon MP® processor(s), or Motorola® lines of processors. Communication port(s) 203 can be any of an RS-232 port for use with a modem based dialup connection, a 10/100 Ethernet port, or a Gigabit port using copper or fiber. Communication port(s) 203 may be chosen depending on a network such a Local Area Network (LAN), Wide Area Network (WAN), or any network to which the computer system 200 connects.

Main memory 204 can be Random Access Memory (RAM), or any other dynamic storage device(s) commonly known in the art. Read only memory 206 can be any static storage device(s) such as Programmable Read Only Memory (PROM) chips for storing static information such as instructions for processor 202.

Mass storage 207 can be used to store information and instructions. For example, hard disks such as the Adaptec® family of SCSI drives, an optical disc, an array of disks such as RAID, such as the Adaptec family of RAID drives, or any other mass storage devices may be used.

Bus 201 communicatively couples processor(s) 202 with the other memory, storage and communication blocks. Bus 201 can be a PCI/PCI-X or SCSI based system bus depending on the storage devices used.

Removable storage media 205 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

The components described above are meant to exemplify some types of possibilities. In no way should the aforementioned examples limit the scope of the invention, as they are only exemplary embodiments.

Figure 3:
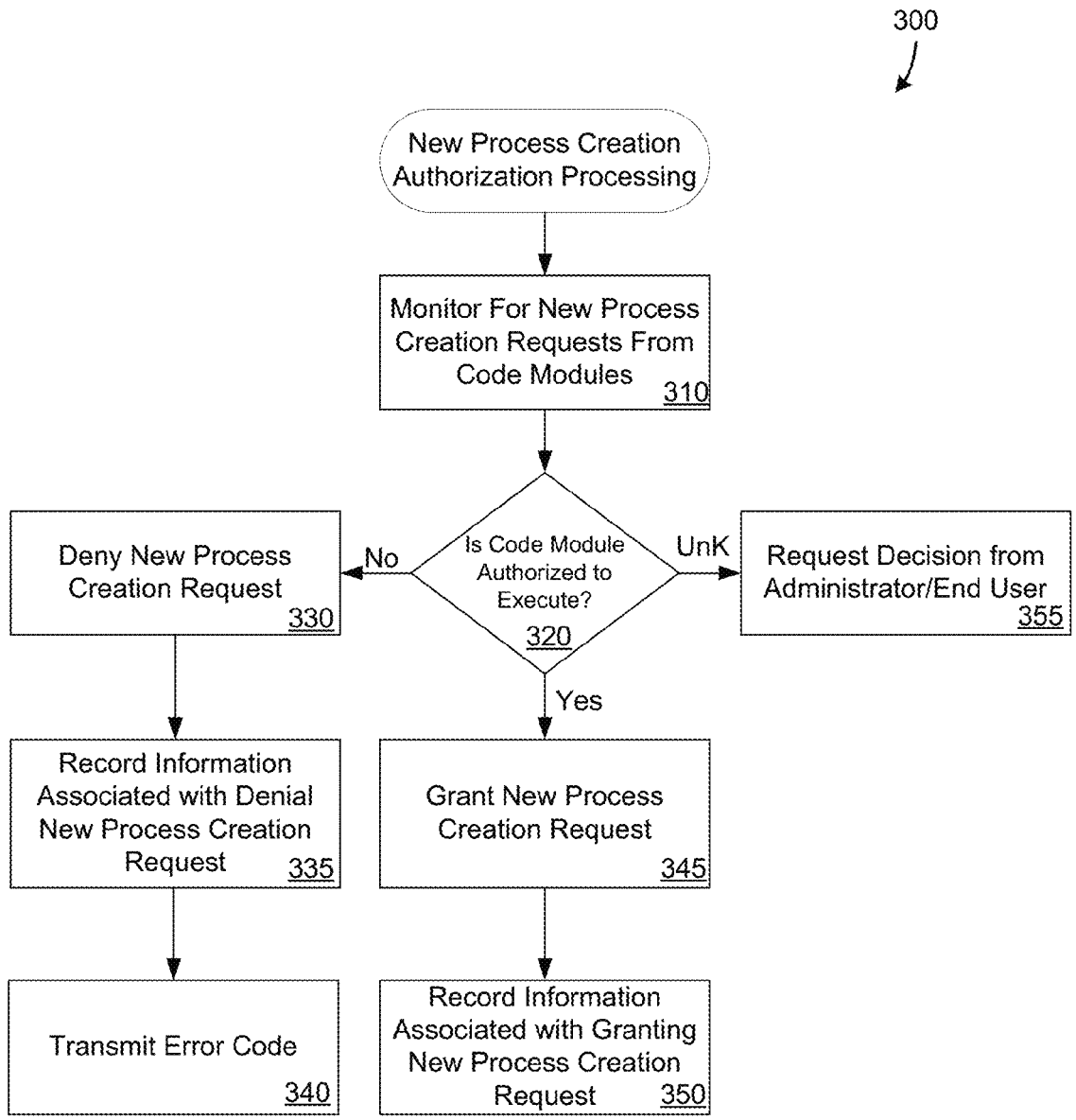
FIG. 3 is a flow diagram illustrating an exemplary method for new process creation authorization processing in accordance with one embodiment of the present invention.

FIG. 3 is a flow diagram illustrating an exemplary method 300 for new process creation authorization processing in accordance with one embodiment of the present invention. In accordance with the present example, a monitoring step, step 310, monitors for process creation requests from code modules. In one embodiment, the kernel mode driver 115 is activated as new processes are created, just before execution. For example, in the context of the Windows operating system, the OS process creation activity monitor 150 may intercept new process creation activity by hooking to the Windows CreateSection API call and in response temporarily turning control over to the kernel mode driver 115 to allow appropriate authentication processing to be performed. The monitoring for new process creation requests may occur during system boot processing or during normal system operations.

At decision block 320, a determination may then be made as to whether the code module is authorized to execute. According to one embodiment, a multi-level whitelisting approach may be used. One embodiment of the multi-level whitelisting approach is described in more detail with reference to FIG. 6. Briefly, in accordance with one embodiment, a content authenticator of the code module being loaded may be calculated and compared to the expected value stored in an entry of one or more of the multiple whitelists available. If the entry is found, the authorization determination may based on one or more parameters as to whether the request should be approved; and then control is returned to the operating system. In one embodiment, requests may be unconditionally approved, unconditionally denied, or a decision may need to be made by an authorized user.

If the request is granted, control flow continues along the "Yes" path exiting decision block 320 to block 345. If the request is denied, control flow continues along the "No" path from decision block 320 to block 330. Otherwise, if no determination can be made without further input from an authorized user, for example, then the determination may be unknown and control flow continues along the "UnK" path from decision block 320 to block 355.

At block 345, a decision has previously been made that the code module in question may continue to load and execute in the normal fashion. In one embodiment, this means that the code module is granted access to system resources such as memory, processors, and/or the like.

At block 330, a decision has previously been made that the code module in question is not allowed to create a new process and the new process creation request is denied. As described in more detail below, a denial may arise for multiple reasons. For example, in one embodiment, a run option may be set to an "unconditional deny" state in one or more of the whitelists. Once this is found, according to various embodiments, the request may be denied and access will not be granted to the system resources such as memory, processors, and the like. In other embodiments, a request may be denied if there are not enough licenses to allow another concurrent instance of a particular software application, for example, that is subject to monitoring by a floating license server. Still yet in other cases, the denial may occur based on one or more conditions placed on the code module for execution. For example, a whitelist may indicate that a code module may be executed only during a certain period of the day. As such, if it is not during the time period indicated, then denial relating to the creation of a new process associated with the requested code module may occur. As another example, a whitelist may indicate that only certain users are authorized to execute a particular code module. As such, when another user attempts to execute the code module, the request may be denied.

In one embodiment, if a new process creation request is denied or granted, information associated with the denial or allowance may be recorded at blocks 335 and 350, respectively. Various additional information associated with the denial or allowance may be recorded. For example, parameters such as a time stamp, reason for denial/allowance, such as run option set to unconditional deny/allow, whitelist level at which the determination was made, whether the denial/allowance was as a result of user input, the content authenticator calculated for the code module, code module name, code module file path, machine id, and/or the like. In various embodiments, this information may be stored in one or more databases. In other embodiments, the information may be transmitted to an external monitoring system which may prepare a summary of denied/allowed process creation requests. This report may then be transmitted to a designated person on a periodic or on-demand basis. At block 340, in some embodiments, in addition to or instead of recording information associated with the process creation denial, an error code associated with the process creation denial may be displayed to an end user, system administrator or other authorized personnel.

According to one embodiment, the information associated with the denial of the new process creation request may be used to remove the unauthorized code modules from the system. This may be done automatically, using manual user intervention, and/or a combination of the two. For example, if the code module associated with the new process creation request is known malware, the code module may be automatically removed. In other cases, user intervention may be desirable. In other cases, nothing may need to be done immediately. For example, if the reason for unconditional denial is because there are not enough licenses currently available, then no further action is necessary. However, in some embodiments, information associated with a denial based on insufficient licenses may be used to determine if additional licenses may need to be purchased.

At block 355, a decision has previously been made that the code module authorization processing of block 320 resulted in an "unknown" state, e.g., there is a need for more information or intervention on the part of an authorized user. According to one embodiment, when this occurs, a request may be made at block 355 for an administrator or end user to determine whether the new process creation request should be granted. For example, when a request is received from a code module that may have a legitimate purpose, but is either not currently in one or more of the whitelists or is currently in one or more of the whitelists but is associated with a run option of "additional authorization required," for example, then a decision may be requested from an administrator or end user. An administrator may use behavior analysis techniques, such as sandboxing, to determine if such code module requests should be granted. In accordance with various embodiments, it should be understood that this appeal to additional authority includes but is not limited to: real-time notification of an administrator or querying one or more external servers that might have more knowledge about the approval status of this module.

According to one embodiment, one or more options may be presented to the end user when a request for a decision is made. In some cases, the options presented may depend on whether the new process creation request occurred during a boot process or after the system is fully booted. In other cases, special configuration options control behavior of the system before a user or management console control is available from the operating system. For example, a user prompt, unattended deny and log mode, and/or a user self-lockdown mode may be present in one or more embodiments of the present invention. According to one embodiment, the user may be prompted that an unapproved module is attempting to execute and may be given various options from which to select. According to one embodiment, the user may be given the following choices: (1) allow the code module to execute this time, but continue to warn or prompt on subsequent attempts (no modification of any whitelists takes place); (2) deny this code module from executing this time and prompt on subsequent attempts (again, no whitelist modification takes place); (3) allow this code module to execute this time and in the future—add an entry in a local whitelist; and/or (4) deny this code module from executing this time and in the future—set run option in one or more of the available whitelists to unconditional deny.

According to one embodiment, in the unattended deny and log mode, the system will deny execution of all unapproved code modules. According to some embodiments, even code modules which have an unknown determination may be denied. In some embodiments, a log file entry may be made noting that the unapproved code module attempted to execute. No user notification or interaction is required. This may be useful in the case of server, for example, since a servers normally do not have an end user immediately available.

If the user self-lockdown mode is active, various embodiments provide that the user may elect to deny all unapproved code modules, but be notified when one attempts to execute through the user interface. In some embodiments, this may be an immediate notification such as a pop-up dialog screen, audible notification, print out, e-mail, and/or the like. Other embodiments provide for notification on an on-demand basis or a periodic basis, such as hourly, daily, weekly, and the like.

Figure 4:
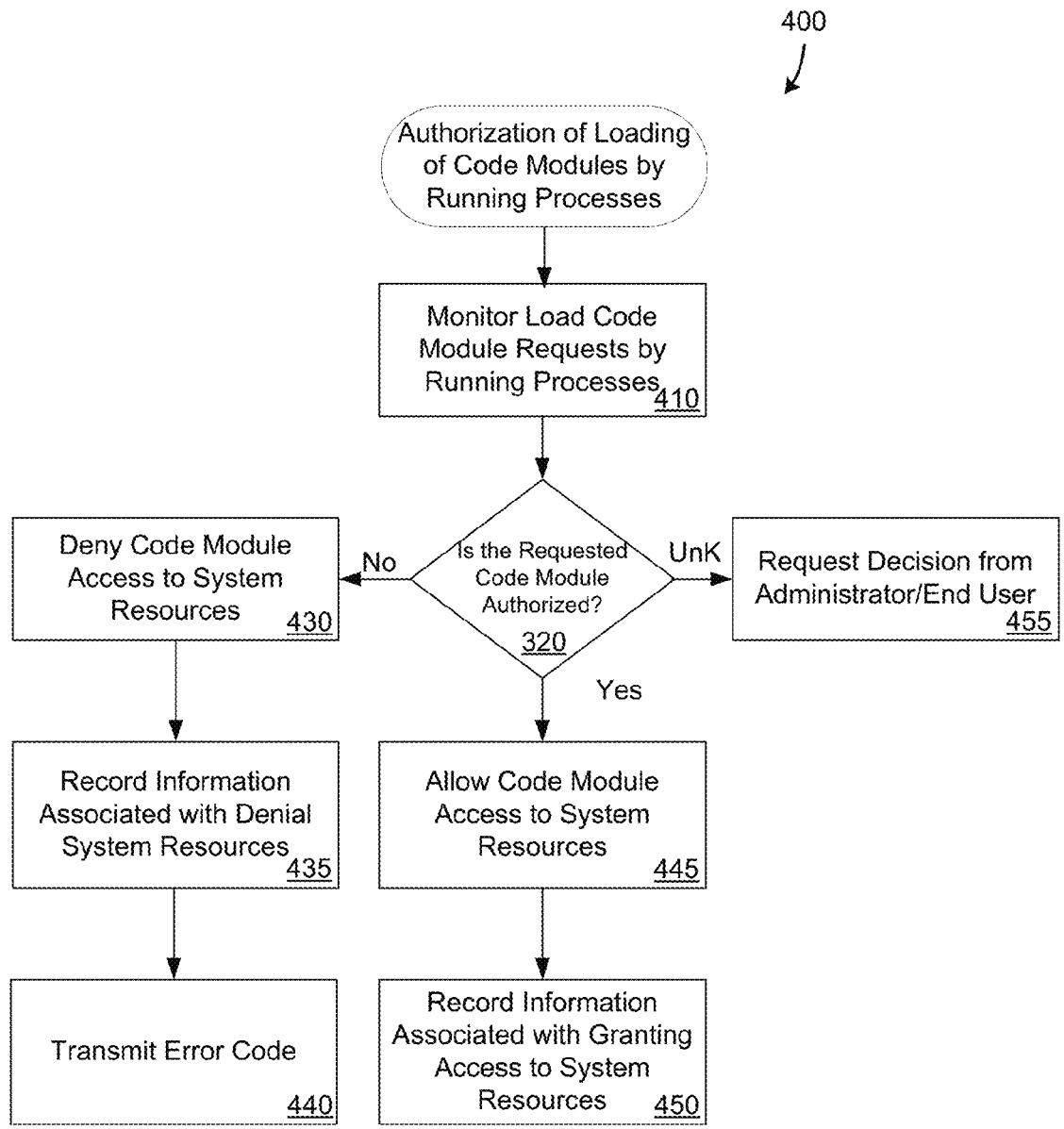
FIG. 4 is an exemplary flow diagram illustrating a method for authorization of loading of code modules by running processes in accordance with one embodiment of the present invention.

FIG. 4 is a flow diagram illustrating a method 400 for authorization of loading of code modules by running processes in accordance with one embodiment of the present invention. In accordance with the present example, a monitoring step, step 410, monitors for the loading of code modules by running processes. In one embodiment, the kernel mode driver 115 is activated as module load activity occurs. For example, in the context of the Windows operating system, the OS module load activity monitor 145 may intercept module loading activity by hooking to the Windows CreateSection API call and in response thereto temporarily turning control over to the kernel mode driver 115 to allow appropriate authentication processing to be performed.

Once a request from a running process is received to load a code module, such as a .dll, .exe, script file, and/or the like, a determination is made at decision block 320, as to whether the request should be authorized. According to various embodiments, a multi-level whitelisting approach may be used. A more detailed description of how this decision is made in accordance with one embodiment of the present invention is provided below. Briefly, in accordance with one embodiment, decision block 320 may result in an unconditional deny, an unconditional allow, or an unknown state (in which case, a decision may be solicited from an authorized user).

According to one embodiment the determination made by decision block 320 may involve determining the name of the code module attempting to be loaded and/or associating the code module attempting to be loaded with the code module or process that made the request. Notably, while the running code module making this request to further load an additional code module (the dependent code module) has already been approved to run, it is not necessarily the case that all dependent code modules requested to be loaded by the running code module should be allowed. For example, a script interpreter may be allowed to run, but it may not be allowed to load a known malicious script file. Additionally, an Internet browser may be allowed to run, but it may not be allowed to run certain plugins or scripts. As such, in one embodiment, the determination with respect to allowing or disallowing the loading of a dependent code module, may be conditional upon the source of the load request (e.g., the identity, hash value and/or type of the code module associated with the running process that initiated the load request) and/or upon the hash value of the dependent code module.

If the request is granted, control flow continues along the "Yes" path exiting decision block 320 to block 445. If the request is denied, control flow continues along the "No" path from decision block 320 to block 430. Otherwise, if no determination can be made without further input from an authorized user, for example, then the determination may be unknown and control flow continues along the "UnK" path from decision block 320 to block 455.

At block 445, a decision has previously been made that the code module in question may continue to be mapped into memory. In one embodiment, this means that the code module is granted access to system resources such as memory, processors, and/or the like. In some cases, the determination as to whether the load request should be granted may depend on the running process which is performing the loading request. For example, some running processes may be authorized to load certain code modules, while other running processes may not be allowed to load the same code modules. If the source of the load request is a script interpreter, for example, then the dependent code module may be authenticated with reference to a multilevel whitelist architecture; however, if the source of the load request is a text editor, for example, then authentication of the dependent code module may be bypassed as there is no intent to run the script.

At block 430, a decision has previously been made that the code module in question is not allowed to be mapped into memory and that the code module load request is denied. As described in more detail below, a denial may arise for multiple reasons. For example, in one embodiment, a run option may be set to an "unconditional deny" state in one or more of the whitelists. Once this is found, according to various embodiments, the request may be denied and access will not be granted to the system resources such as memory, processors, and the like. In other embodiments, the denial may occur based on conditions placed on the code module for loading, such as those discussed above with reference to FIG. 3.

In some embodiments, if a load module request is denied or granted, information associated with the denial or allowance may be recorded, see blocks 435 and 450. Various information associated with this unconditional denial or unconditional allowance may be recorded at blocks 435 and 450, respectively. For example, parameters such as a time stamp, reason for denial/allowance, such as run option set to unconditional deny/allow, the running process requesting the loading of the code module, whitelist level at which the determination was made, if the denial/allowance resulted from user input, the content authenticator calculated for the code module, code module name, code module file path, machine id, and/or the like.

In various embodiments, this information may be stored in one or more databases. In other embodiments, the information may be transmitted to an external monitoring system which may prepare a summary of denied/allowed code module load requests. As indicated above, with reference to FIG. 3, such a report may then be transmitted to a designated person on a periodic or on-demand basis. Other embodiments, simply determine an error code when the load code module request is denied and transmits this error code to an end user, system administrator or other authorized personnel, see step 440.

At block 455, a decision has previously been made that the code module load authorization processing of block 320 resulted in "unknown" state, e.g., there is a need for more information or intervention on the part of an authorized user. According to one embodiment, when this occurs, a request may be made at block 455 for an administrator or end user to determine whether the load request should be granted. Various embodiments allow for different options. As such, it should be understood that this appeal to additional authority includes but need not be limited to real-time notification of an administrator or querying one or more external servers that might have more knowledge about the approval status of this module.

According to one embodiment, one or more options may be presented to the end user when a request for a decision is made. In some cases, the options presented may depend on whether the loading request occurred during a boot process or after the system is fully booted. As described above with reference to FIG. 3, in other embodiments, special configuration options may control behavior of the system before a user or management console control is available from the operating system. For example, a user prompt mode, unattended deny and log mode, and/or a user self-lockdown mode may be supported in accordance with one embodiment. According to one embodiment, in user prompt mode, the user may be provided with one or more of the following choices: (1) allow this code module to be mapped into memory this time, but continue to warn or prompt on subsequent attempts (no modification of multi-level whitelists); (2) deny this code module from being mapped into memory this time and prompt if it attempts to do so in the future (no multi-level whitelist modification); (3) allow this module to be mapped into memory this time and in the future—add a content authenticator to a whitelist; and/or (4) deny this code module from being mapped into memory this time and in the future—set run option to unconditional deny in the whitelist.

Figure 5:
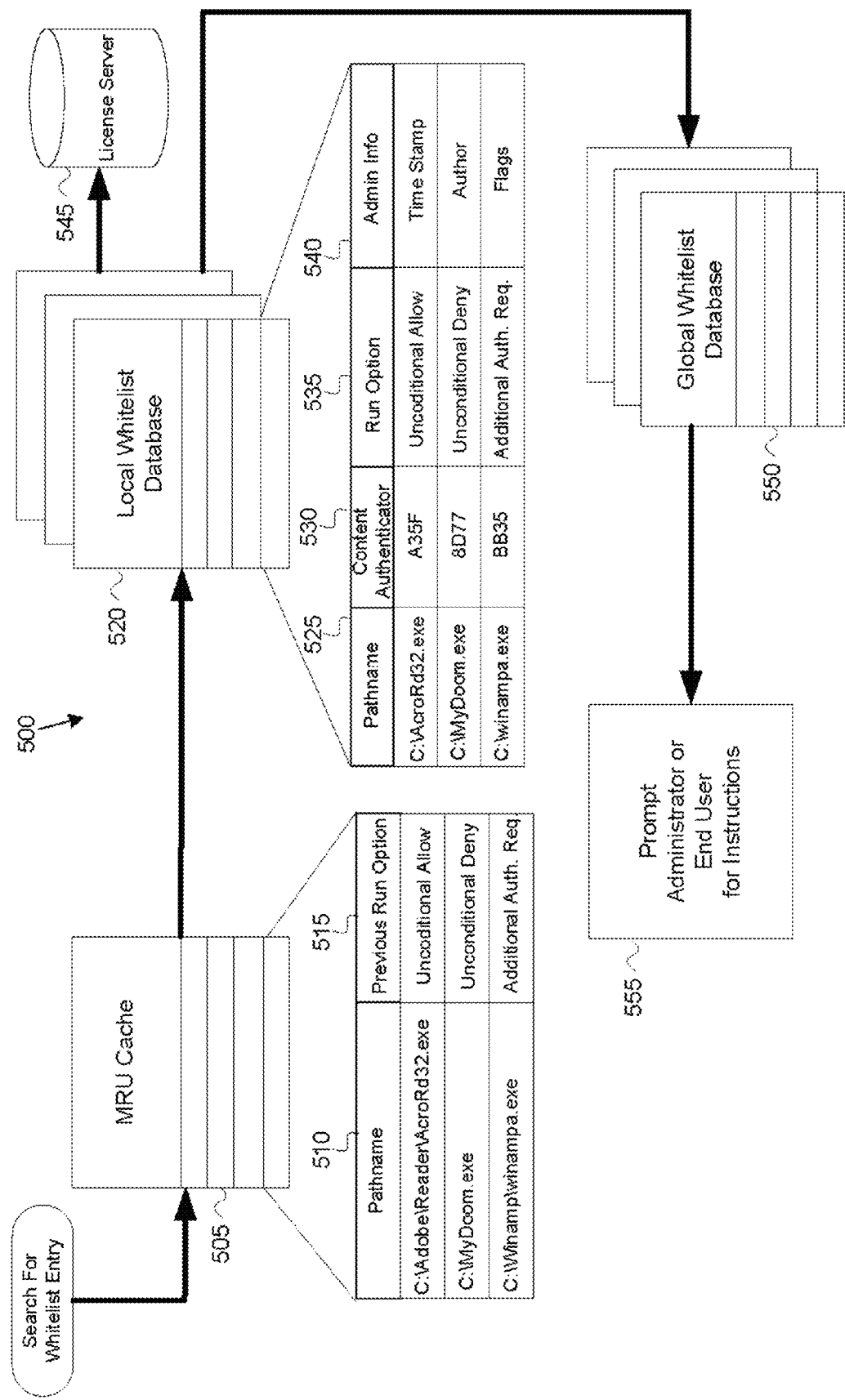
FIG. 5 conceptually illustrates an exemplary multi-level whitelist database system in accordance with one embodiment of the present invention.

FIG. 5 conceptually illustrates an exemplary multi-level whitelist database system 500 in accordance with one embodiment of the present invention. According to one embodiment, multiple whitelists with varying scope may be used to authenticate requests. In the present example, an MRU cache 505, a local whitelist 520, and a global whitelist 550 are consulted to authenticate requests. In one embodiment, there may be one or more of each scope/level of whitelist. In other embodiments, one or more levels of whitelist may not be present.

According to one embodiment, authentication processing of a request relating to a code module begins with the MRU cache 505, if insufficient information exists in the MRU cache 505 to make a deny/grant decision, then authentication processing continues with the one or more local whitelists 520. If insufficient information exists in the one or more local whitelists 520, then authentication processing continues with reference to either the floating license server 545 or the one or more global whitelists 550. If insufficient information exists in the one or more global whitelists 550, then the decision regarding whether to allow or deny loading or execution of the code module in question may be delegated to an authorized user 555.

The MRU cache 505 allows the use of a cache acceleration technique involving the use of an optional most recently used list. The MRU cache 505 facilitates real-time authentication of code modules by maintaining a relatively small set of cache entries 506 relating to code modules that have recently been requested to be executed or to be loaded. In addition, these entries generally contain a subset of the information available for the same entries in one or more local whitelists 520 and/or one or more global whitelists 550.

Examples of code modules include, but need not be limited to, executables, dynamically-linked libraries (DLLs), scripts, and/or the like. In one embodiment, the MRU cache 505 may be stored in locally in memory, in a swap file, and/or the like. In other embodiments, the MRU cache 505 may be stored on other storage media locally, or in some cases, even remotely.

According to one embodiment, the MRU cache 505 comprises an in-memory list of entries 506 identifying path names 510 and previously associated run-options 515 for the most recently requested code modules. Entries may be added to the MRU cache 505 after code modules are authenticated by other means.

A second tier of the multi-level whitelist approach may include one or more local whitelists 520. A local whitelist generally would be expected to be more comprehensive than an MRU cache and less comprehensive than a global whitelist. According to one embodiment, a local whitelist may identify code modules which have been locally approved for execution on one or more computer systems or a whitelist that has otherwise been customized for use by one or more particular computer systems. According to various embodiments, a local whitelist database 520 may contain entries 521 for files known to be installed on one or more computer system. For example, according to one embodiment, a local whitelist may be created by a computer lock down procedure that scans one or more local computers for code modules which are then added to the local whitelist database 520. In other embodiments, an end user or administrator may be authorized to add or remove entries indicating which code modules are allowed to execute and/or load.

In one embodiment, the entries 521 found within the local whitelist 520 may consist of a file path 525, content authenticator value 530, run-options 535 and administrative information 540. Run-options 535 may consist of one or more of the following states: "unconditional allow," "unconditional deny," "conditional allow based on flags," or "requires additional user authorization." In one embodiment, the local whitelist 520 may contain flags indicating information, such as whether the corresponding code module is a script interpreter and conditions on execution. For example, in one embodiment, a condition on execution may be approval from the floating license server 545. In another embodiment, compliance with time prohibitions or time authorizations may be necessary for the code module to be loaded or executed. For example, a corporate enterprise may only allow the execution of code modules associated with non-work-related software applications, such as a music player application, after regular business hours.

If an entry contains a flag indicating that the code module is being monitored by a floating license server 545, the compliance with restrictions placed by the floating license server will be necessary for the code module to execute. For example, only a limited number a licenses may be available for concurrent instances of a particular code module. In this case, there must be a free license before the code module will be allowed to execute. As another example, within a corporate setting, a license may only be valid for a particular physical site or location, a particular computer, or by a particular user or set of users. In these cases, compliance with these license restrictions must be met before the code module will be allowed to execute.

Some embodiments, allow for the use of one or more global whitelists 550. Typically, a global whitelist would be expected to be more comprehensive than a local whitelist. A global whitelist 550 may identify commonly accepted code modules that are approved for execution. In one embodiment, the global whitelist 550 represents a list of all known approved code modules, not limited to those existing on any one particular computer system or those within a particular corporate enterprise.

In some embodiments, the global whitelist 550 may identify code modules associated with common operating system software, operating system services, and common utilities such as word processors, internet browsers, and/or the like. In addition, entries 551 of the global whitelist database 550 may contain one or more fields that contain various information about the corresponding code module. For example, in some cases the fields may include the same fields as described in connection with the local whitelist 520. In other cases, a global whitelist may contain additional information in the entries 551. For example, entries 551 in the global whitelist database 550 may contain one or more of the following: a file name and/or a file path, a content authenticator, information identifying the user or process that created and/or last edited the entry, a run option, a time stamp, and/or the like.

As described earlier, according to various embodiments, the global whitelist 550 may be provided by a source external to the organization, enterprise or individual end user or group of end users whose code modules are whitelisted. In some embodiments, a trusted service provider may maintain the global whitelist 550 and allow local copies of the global whitelist to be stored on computer systems associated with a registered user of the trusted service provider. In other embodiments, the global whitelist may exist only on one or more protected servers and is not distributed in the form of local copies. In one embodiment, the global whitelist may be populated with a truly "global" list of all known safe code modules as identified by multiple sources.

In other embodiments, the global whitelist may be edited and/or created by an administrator based on an enterprise-, division-, development group-wide software policy, for example. In addition, according to various embodiments, the global whitelist database may be updated on a periodic schedule such as yearly, monthly, weekly, etc. or on an as needed basis. In an enterprise network, for example, the global whitelist database might contain a limited subset of known good code modules that are approved for use with the particular enterprise.

According to some embodiments, a fourth tier for authentication processing involving prompting an administrator or end user 555 for instructions regarding whether to allow or disallow the loading or execution of the code module in question may be included in the multi-level whitelist approach. The prompting for end-user instructions may occur after a search in any one of the other levels. Further detail regarding exemplary multi-level code module authorization is provided with reference to FIG. 6.

Figure 6:
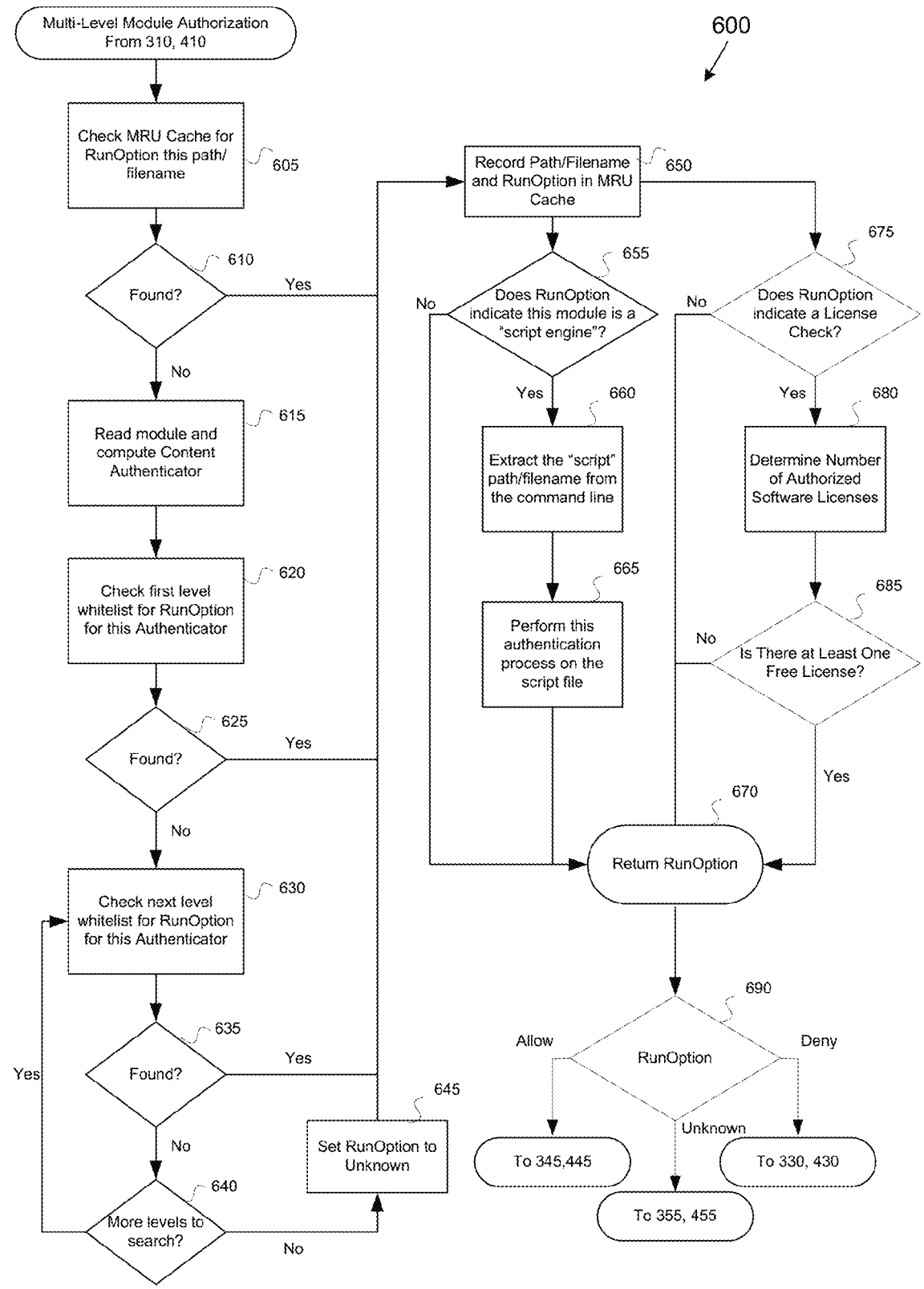
FIG. 6 is a flow diagram illustrating a method of using a multi-level whitelist approach in accordance one embodiment of the present invention.

FIG. 6 is a flow diagram illustrating a method 600 of using a multi-level whitelist approach in accordance one embodiment of the present invention. In accordance with the present example, multiple whitelists, such as one or more MRU caches, one or more local whitelists, and one or more global whitelists, may be used to authenticate requests relating to code modules. In accordance with one embodiment, available whitelists are prioritized to create a search order. In some embodiments, this may be done based on the relative comprehensiveness or scope of the whitelists. In other embodiments, the order in which the whitelists are searched may depend on flags associated with the code module. Still yet, in other embodiments, the prioritization may be based on the code module extension such as .dll or .exe.

A request for code module authorization may occur in a variety of manners, see blocks 310 and 410 of FIG. 3 and FIG. 4, respectively, for two examples. In any event, once a request for authorization is received, and a prioritization of the available whitelists has been established, the multi-level code module authorization process may begin.

At block 605, the MRU cache is scanned to determine, see decision block 610, if an entry associated with the requested code module is present. If an entry is not found then a content authenticator is computed for the requested code module at block 615. After the content authenticator for the code module is determined, at block 620, the next whitelist is checked for a matching entry. This whitelist may be another MRU cache, a local whitelist, or a global whitelist. If no matching entry is found, then at block 630, the next prioritized whitelist is checked. If no matching entry is found, then a determination is made at decision block 640 as to whether there are any more whitelists to search. If not, according to one embodiment, a new entry is created in the last available whitelist level for the code module with the run option set to unknown.

If during decision steps 610, 625, or 635 a entry corresponding to the code module is found, then processing proceeds to block 650. At block 650, a new MRU entry is created (or a least recently used MRU entry is overwritten) for the code module and the filename and run option found in the whitelist entry may be recorded in the new MRU entry.

At decision block 653, a determination is made regarding whether to check various other flags that may be associated with the whitelist entry. For example, if the run option was already determined to be "deny," then no further checking need be performed and the run option may simply be returned at block 670. Otherwise, however, if the run option was previously determined to be "allow," then various other flags associated with the whitelist entry may be checked at blocks 655 and 665, respectively, to determine whether special scrip file processing or license restriction compliance needs to be performed.

At decision block 655, a determination is made based on various flags that may be associated with the whitelist entry regarding whether the code module is a script interpreter. If not, then the run option is returned at block 670. Otherwise, if the code module is a script interpreter, then at block 660, information about the associated script is extracted. For example, information regarding one or more command line parameters or arguments may be obtained, such as a file path of a script file to be run by the script interpreter. Then, at block 665, the multi-level code module authorization is performed on the script file. Advantageously, this allows script files to be selectively authorized for execution on a computer system in a manner similar to executable files. Otherwise, if the run option does not identify the code module as a script interpreter, then processing branches from decision block 655 to decision block 665.

At decision block 665, a determination is made based on various flags that may be associated with the whitelist entry regarding whether the code module is one that requires compliance with one or more license restrictions, such as the code module being monitored by a floating license server. If so, then at block 680, information regarding the number of authorized software licenses is retrieved. Subsequently, at decision block 685, it is determined whether there is at least one free license for the code module to allow an additional concurrent instance of the code module. If so, then the run option is returned at block 670. If no free licenses are available, then the run option of "deny" is returned at block 670. In alternative embodiments, additional checks may be performed, such as whether the user authorized to run this software, whether the request in compliance with physical location restrictions, and/or the like.

Once a run option is returned to the return run option block 670, the run option decision block 690 returns the appropriate result indicating the code module is either allowed, denied, or that more information or manual intervention is required to make the determination.

In conclusion, the present invention provides novel systems, methods and arrangements for securing a computer system by allowing only the execution of authorized computer program code. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method comprising:
  intercepting, by a kernel-level driver within a kernel of an operating system of a computer system, activity in connection with a file system associated with the computer system or the operating system relating to a code module;
  determining, by the kernel-level driver, whether to allow the intercepted activity to proceed by performing a real-time authentication process of the code module with reference to a multi-level whitelist database architecture, wherein the multi-level whitelist database architecture includes:
    a local copy of a remote global whitelist database hosted by a trusted third-party service provider containing cryptographic hash values of approved code modules, which have been identified by multiple sources as not containing viruses or malicious code, wherein the local copy of the remote global whitelist database is hosted within an enterprise network with which the computer system is associated;
    a local whitelist database stored within the file system including a subset of the cryptographic hash values of the approved code modules; and
    a most recently used (MRU) cache maintained within a random access memory of the computer system and containing entries corresponding to code modules that have previously been authenticated by the real-time authentication process, the entries each including information indicative of whether the corresponding code module was previously affirmatively authenticated by the real-time authentication process;
  when the intercepted activity is allowed to proceed as a result of said determining, permitting, by the kernel-level driver, the code module to be loaded and executed by the computer system; and when the intercepted activity is not allowed to proceed as a result of said determining, preventing, by the kernel-level driver, the code module from being loaded and executed by the computer system.

2. The method of claim 1, further comprising:
when the code module cannot be authenticated with reference to the MRU cache, then determining whether the code module is authorized to execute by calculating a cryptographic hash value of the code module and causing the cryptographic hash value to be compared with one or more cryptographic hash in the local whitelist database; and when the code module cannot be authenticated with reference to the local whitelist database, then determining whether the code module is authorized to execute by causing the cryptographic hash value to be compared with one or more cryptographic hash values in the local copy of the remote global whitelist database.

3. The method of claim 1, wherein the code module comprises an executable object.

4. The method of claim 1, wherein the code module comprises a file system object.

5. The method of claim 1, wherein the code module comprises a script file.

6. The method of claim 1, wherein the local whitelist database is maintained by an information technology (IT) administrator of the enterprise network, whereby the IT administrator has the ability to tailor the local whitelist to allow or disallow particular code modules from running on a plurality of computer systems within the enterprise network, including the computer system.

7. The method of claim 1, wherein said intercepting comprises the kernel-level driver monitoring process creation or module load activity by the operating system.

8. The method of claim 1, wherein said intercepting comprises the kernel-level driver hooking low-level application programming interfaces (APIs) of the operating system so as to be activated responsive to one or more operations of the operating system of interest including one or more of process creation, module loading, and read/write activity within the file system.

9. The method of claim 2, wherein the cryptographic hash value comprises a Message Digest #5 (MD-5) hash value.

10. The method of claim 2, wherein the cryptographic hash value comprises a Secure Hash Algorithm (SHA) hash value.

11. A program storage device readable by a computer system, embodying a program of instructions executable by one or more computer processors of the computer system to perform a method comprising:
intercepting, by a kernel-level driver within a kernel of an operating system of the computer system, activity in connection with a file system associated with the computer system or the operating system relating to a code module;
determining, by the kernel-level driver, whether to allow the intercepted activity to proceed by performing a real-time authentication process of the code module with reference to a multi-level whitelist database architecture, wherein the multi-level whitelist database architecture includes:
a local copy of a remote global whitelist database hosted by a trusted third-party service provider containing cryptographic hash values of approved code modules, which have been identified by multiple sources as not containing viruses or malicious code, wherein the local copy of the remote global whitelist database is hosted within an enterprise network with which the computer system is associated;
a local whitelist database stored within the file system including a subset of the cryptographic hash values of the approved code modules; and
a most recently used (MRU) cache maintained within a random access memory of the computer system and containing entries corresponding to code modules that have previously been authenticated by the real-time authentication process, the entries each including information indicative of whether the corresponding code module was previously affirmatively authenticated by the real-time authentication process;
when the intercepted activity is allowed to proceed as a result of said determining, permitting, by the kernel-level driver, the code module to be loaded and executed by the computer system; and
when the intercepted activity is not allowed to proceed as a result of said determining, preventing, by the kernel-level driver, the code module from being loaded and executed by the computer system.

12. The program storage device of claim 11, wherein the method further comprises:
when the code module cannot be authenticated with reference to the MRU cache, then determining whether the code module is authorized to execute by calculating a cryptographic hash value of the code module and causing the cryptographic hash value to be compared with one or more cryptographic hash in the local whitelist database; and
when the code module cannot be authenticated with reference to the local whitelist database, then determining whether the code module is authorized to execute by causing the cryptographic hash value to be compared with one or more cryptographic hash values in the local copy of the remote global whitelist database.

13. The program storage device of claim 11, wherein the code module comprises an executable object.

14. The program storage device of claim 11, wherein the code module comprises a file system object.

15. The program storage device of claim 11, wherein the code module comprises a script file.

16. The program storage device of claim 11, wherein the local whitelist database is maintained by an information technology (IT) administrator of the enterprise network, whereby the IT administrator has the ability to tailor the local whitelist to allow or disallow particular code modules from running on a plurality of computer systems within the enterprise network, including the computer system.

17. The program storage device of claim 11, wherein said intercepting comprises the kernel-level driver monitoring process creation or module load activity by the operating system.

18. The program storage device of claim 11, wherein said intercepting comprises the kernel-level driver hooking low-level application programming interfaces (APIs) of the operating system so as to be activated responsive to one or more operations of the operating system of interest including one or more of process creation, module loading, and read/write activity within the file system.

19. The program storage device of claim 12, wherein the cryptographic hash value comprises a Message Digest #5 (MD-5) hash value.

20. The program storage device of claim 12, wherein the cryptographic hash value comprises a Secure Hash Algorithm (SHA) hash value.

* * * * *